F. B. MUELLER.
FLEXIBLE CONNECTION FOR GAS METERS.
APPLICATION FILED JUNE 28, 1910.
1,042,251. Patented Oct. 22, 1912.
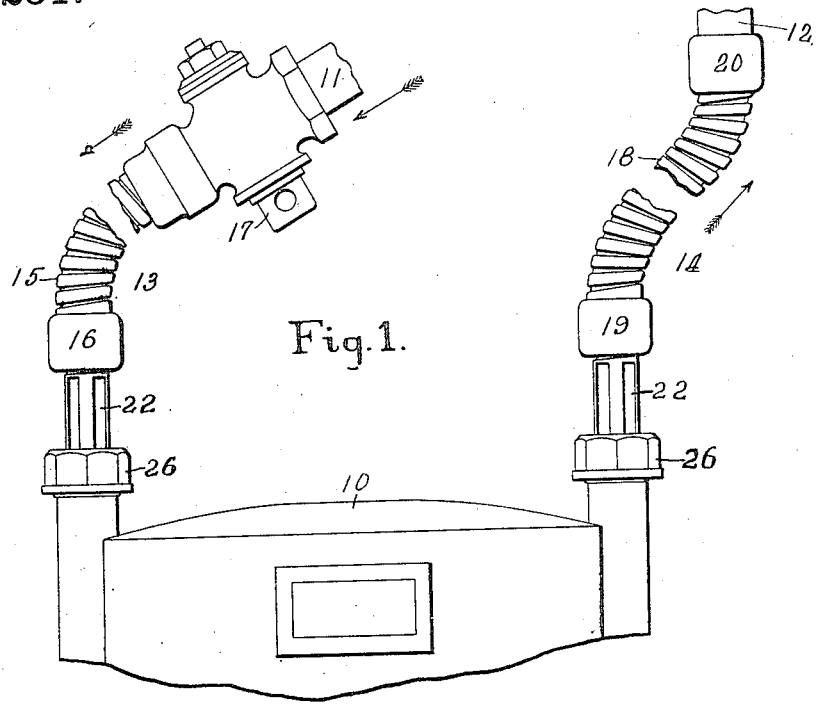
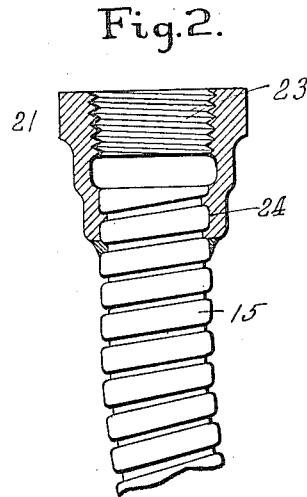
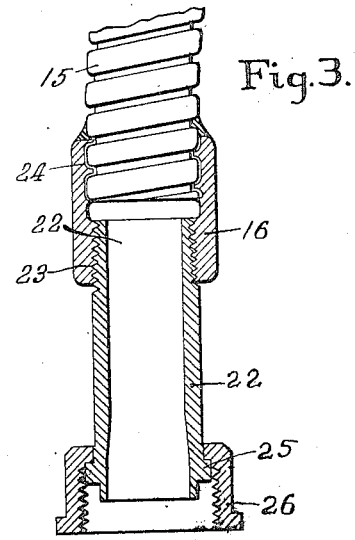
Witnesses,
Chester W. Hathaway.
Inventor
Fred. B. Mueller.
by Meyns, Cushman & Rea
Attorney.

UNITED STATES PATENT OFFICE.

FRED B. MUELLER, OF DECATUR, ILLINOIS, ASSIGNOR TO H. MUELLER MANUFACTURING COMPANY, OF DECATUR, ILLINOIS, A CORPORATION OF ILLINOIS.

FLEXIBLE CONNECTION FOR GAS-METERS.

1,042,251.  Specification of Letters Patent.  Patented Oct. 22, 1912.

Application filed June 28, 1910. Serial No. 569,388.

*To all whom it may concern:*

Be it known that I, FRED B. MUELLER, a citizen of the United States, residing at Decatur, in the county of Macon and State of Illinois, have invented new and useful Improvements in Flexible Connections for Gas-Meters, of which the following is a specification.

My invention relates to those flexible connections for gas meters which are commonly made between a gas main and a meter. These connections are used in order that the meter will not be moved out of place or damaged by reason of expansion of the main leading to it, and in order that more latitude may be had in the placing of the meter.

At the present time plumbers make these flexible connections right on the ground, an ordinary lead pipe of suitable length being connected to the gas main and to the meter by wiped joints. There are two of these connections usually found with every meter installed, one of them being made from the conduit leading from the street main to the meter, and the other leading from the meter to the service main. Considerable time is consumed in making these connections, and it not infrequently happens that they are poorly made. Beside being commonly made with ordinary pipe which is very likely to flatten, particularly on sharp bends, and requires, therefore, a good deal of care in handling in such situations, the joints are very often poorly made with the result that the connection leaks at once or a leak results after a certain time when there has been expansion and contraction between the parts, or else they have been subjected to a jar or strain of some sort. Very often meters are placed in out of the way places, in the cellars of houses, and careless people store objects about the meter and sometimes upon it which bend, flatten and puncture, or otherwise damage the flexible lead pipe connection. The lead pipe connection is also very easily tapped, and it is sometimes tapped between the main and the meter and many thousand feet of gas stolen. These openings can be easily plugged up at intervals when the inspector is due, and as none of the gas drawn through opening has passed through the meter theft is very hard to detect. Still another disadvantage there is in the use of the ordinary lead pipe in making these connections, on account of the fact that a plumber who cares more about saving time and money than about excellency of his work will use a smaller lead pipe than should be used in order to properly supply the system through the meter. The result is a low pressure when the system is worked at its full capacity, and at those times under certain conditions condensation in the meter due to the expansion of gas passing through the small pipe connection.

It is the object of my invention to obviate these disadvantages of the flexible meter connection as ordinarily made, and to this end I have designed an article of manufacture comprising an armored or metallic flexible section of conduit equipped with a pipe fitting at each end. The section of conduit is attached by a combined mechanically locked and wiped joint, and is of a size proper to be used with the standard fittings attached thereto. I manufacture two of these articles or devices for use with standard meters, one a flexible section equipped with a coupling and valve at opposite ends, for use on the inlet side of the meter, the valve being the usual cut off valve which is placed next the main; and the other being a like flexible section of armored conduit equipped with a coupling at each end for use on the outlet side of the meter. I manufacture these articles in all standard sizes, and test the same under high pressure for leaks before placing them in stock. Leaky joints and weak joints are thereby detected and such articles as develop these are worked over and the defects remedied. These flexible connections are supplied to the trade and their use is attended with many advantages. To begin with the time and expense incident to making the present flexible connections is saved. The manufactured connection is ready to attach by an ordinary wrench to the meter and gas main, and this can be done in a few minutes. This connection is always the right size, the flexible conduit and the attached fittings being properly matched at the factory. The connection as attached is free from leaks, the joints as aforesaid being especially made and tested, as the joints are mechanically locked as well as being wiped, and the breaking of the joint due to any distortion is practically impossible and there is likewise extremely small liability of the development of leaks after the connection has been installed. The construction is sturdy, armored or metallic ribbed flexible conduit being used. This may be bent at any desired angle without danger of flattening. It also stands great external pressure without distortion and hence is little liable to external damage. Armored or ribbed metallic conduit is not easily tapped, and for this reason the theft of gas is more difficult. Likewise accidental puncture is effectually prevented.

All of these various advantages and a detailed construction of my improved flexible connection will be more readily apparent from the following description taken in connection with the accompanying sheet of drawing, in which—

Figure 1 is an elevation of the top portion of a standard meter showing the connections applied. Fig. 2 is a view showing the one end connection of the flexible metallic conduit to a fitting, and Fig. 3 is a view in section showing the other end of the flexible conduit attached to a fitting.

Referring to the drawing 10 is a gas meter of the standard type.

11 indicates the supply main, and 12 indicates the service main.

13 and 14 are two of my flexible connections, respectively connecting the supply main with the meter and the meter with the service main. These connections are essentially similar, differing from each other only in the character of the pipe fittings attached thereto. The connection 13 consists of a section of ribbed metallic conduit 15 with a coupling 16 attached to one end, the fitting 21 at its opposite end, and a cut off valve 17 of the plug type to which the fitting 21 is attached. These elements, the coupling 16 and the valve 17 interconnected by the flexible section of metallic conduit 15, the coupling, constitute one form of my improved article of manufacture, while the flexible connection 14, made up of a section of flexible metallic conduit 18 and couplings 19 and 20, constitute another form of my invention. The couplings 16 and 19, which engage directly with the meter, are of similar construction.

The flexible conduit I prefer to use is an iron or steel ribbed spiral conduit. This conduit is now made for very high pressures and is extremely durable and serviceable. I make use of the ribs or spirals of the conduit to mechanically lock to it the fittings or couplings with which it is equipped. An inspection of Figs. 2 and 3 will make this clear. The coupling or fittings 16 and 21 are provided with standard screw threads 23 at one end, while at the other end are formed ribs or coarse screw threads 24 which intermesh with the ribs or spirals of the flexible metallic conduit inserted therein. A good mechanical connection is thus made. Preferably I make the mechanical joint a loose one, and then run solder or lead into the joint and wipe it as shown in Fig. 3. For some classes of work I may cast the fitting directly on the end of the flexible connection. The joint is then integral and tight and does not have to be wiped.

Each of the couplings 16 and 19 carries a neck 22 of the desired length having an annular flange 25 at its outer end and external threads on its inner end, the latter fitting into the coupling 16 (or 19) and engaging with the threads 23. A coupling nut 26 is carried about the neck 22, the nut having a contracted opening at one end revolubly receiving the threaded end of the neck 22 therethrough, and held thereon by the flanges 25. The nut 26 has angular faces adapted to be gripped by a wrench or other tool to screw the nut tightly over the threaded end of the pipe of the meter 10. It is thus seen that I have provided a meter connection consisting of a pair of flexible sections admitting of a relative movement between the supply main 11, the meter 10, and the service main 12, and of the quick adjustment of the meter to the mains without the danger of breaking or flattening the sections of the connection.

In adapting the meter 10 to the mains 11 and 12 by this improved connection, first, the nuts 26 are loosely connected to the pipes of the meter 10, then the valve 17 is screwed to the supply main 11. In this latter operation the complete section 13 turns upon the nut 26 and the spirally wound flexible conduit is submitted to torsional strain and at the same time may be held in the desired bent position during the turning or screwing action. In a like manner the coupling 20 is now screwed upon the service main 12, the section 14 turning loosely upon the nut 26 of the coupling 19. When the valve 17 and the coupling 20 are screwed up tightly on the respective mains 11 and 12, the meter couplings 16 and 19 are firmly clamped in position upon the meter pipes by turning the nuts 26 down on the meter pipes and binding the flanges 25 of the necks 22 against the pipes, forming a sealed joint. Thus, no wiped joints are necessary, the meter can be quickly adjusted and removed from the mains, each entire section may be turned without submitting the same to torsional or other strain, and the sections admitting of their bending and adjustment without the danger of cracking or collapsing the same.

My improved flexible connection consisting of the flexible section of metallic conduit and its two attached fittings thus forms at once a neat, sturdy and efficient article of manufacture which is comparatively inexpensive to make in large numbers, and which is convenient and most profitable to use.

While I have described the best form of my invention now known to me, describing it especially in connection with gas meters of the ordinary type it is obvious that my invention may be given various forms by the skilled engineer without departing from its generic spirit and that likewise my invention may find other fields of use. That it is especially adapted for use with high pressure mains and meters or with high pressure devices directly connected to the mains is evident, and modifications may well be made to adapt it to a particular device without in any wise departing from the generic spirit, and to this end the invention may be equipped at the factory with any style or character of pipe fitting desired. All such modifications I desire to cover in the annexed claims.

What I claim is:

1. In a flexible connection, and in combination, a flexible conduit having exterior spiral ribs constituting external coarse screw threads, couplings at the ends of the conduit having internal coarse screw threads engaging over the external threads at the opposite ends of the conduit, securing means for the couplings adapted to seal the same on the ends of the conduit, a neck permanently secured at one end in one of the couplings and having a fixed collar upon its opposite end, and a coupling nut loosely mounted on the neck and having an inwardly extending flange at its inner end adapted to engage the collar whereby the coupling nut is retained on the neck.

2. In a gas meter connection, the combination with a fixed pipe member, and a flexible conduit having external metallic screw-thread ribs, of internally screw threaded couplings engaging over and being fixed upon the ends of the flexible conduit, a neck threaded into and being fixed upon one of the couplings and having an exterior smooth surface at its outer end, said neck further having an integral collar at its outer end beyond the smooth surface, and a coupling nut rotatable upon the neck and adapted for threaded engagement with said pipe member and having an inwardly extending flange at its inner end adapted to engage said collar and bind the same against said pipe member.

In testimony whereof I have hereunto set my hand in presence of two subscribing witnesses.

FRED B. MUELLER.

Witnesses:
W. R. GUSTIN,
W. R. BIDDLE.